United States Patent [19]

Christiansen

[11] Patent Number: 4,498,834

[45] Date of Patent: Feb. 12, 1985

[54] VALVE FOR FUEL PIN LOADING SYSTEM

[75] Inventor: David W. Christiansen, Kennewick, Wash.

[73] Assignee: The United States of America as represented by the United States Department of Energy, Washington, D.C.

[21] Appl. No.: 445,606

[22] Filed: Nov. 30, 1982

[51] Int. Cl.³ .......................... G21C 21/00; E06B 7/00
[52] U.S. Cl. ..................................... 414/291; 414/292
[58] Field of Search ........................ 414/291, 292, 146

[56] References Cited

U.S. PATENT DOCUMENTS

| | | |
|---|---|---|
| 3,711,993 | 1/1973 | Liesch . |
| 3,907,123 | 9/1975 | Howell . |
| 4,070,240 | 1/1978 | Kugler et al. . |
| 4,158, 601 | 6/1979 | Gerkey . |
| 4,167,959 | 9/1979 | Weichselgartner et al. . |
| 4,341,530 | 6/1982 | Loth et al. ........................ 414/291 X |

*Primary Examiner*—Robert G. Sheridan
*Attorney, Agent, or Firm*—Edward W. Nypaver; Robert Southworth, III; Richard E. Constant

[57] ABSTRACT

A cyclone valve surrounds a wall opening through which cladding is projected. An axial valve inlet surrounds the cladding. Air is drawn through the inlet by a cyclone stream within the valve. An inflatable seal is included to physically engage a fuel pin subassembly during loading of fuel pellets.

4 Claims, 12 Drawing Figures

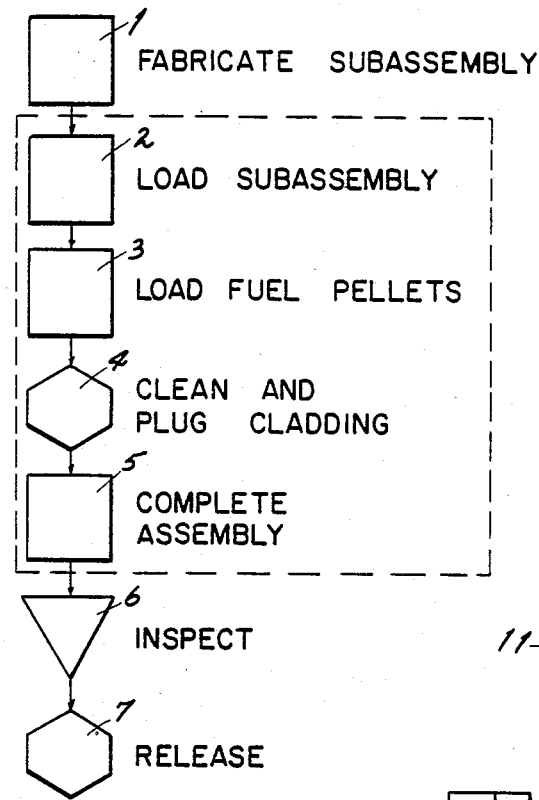
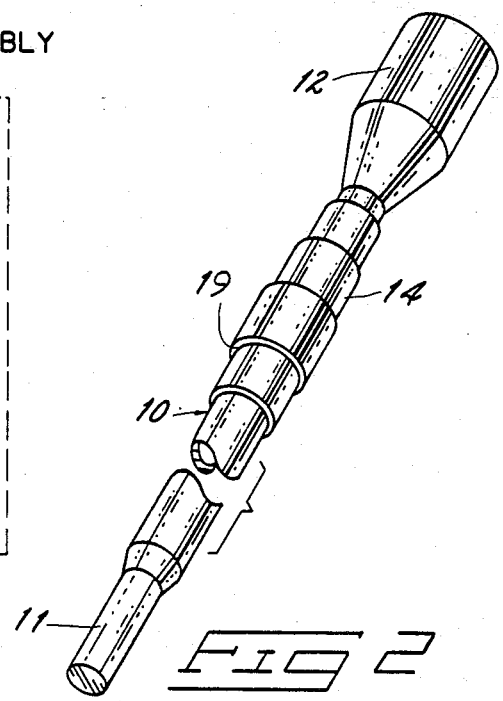
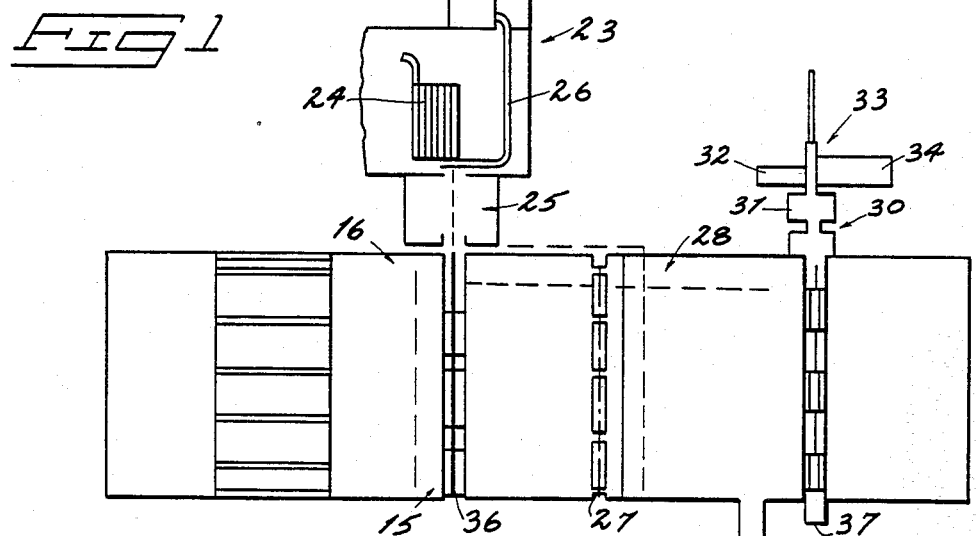
FIG 1
FIG 2
FIG 3

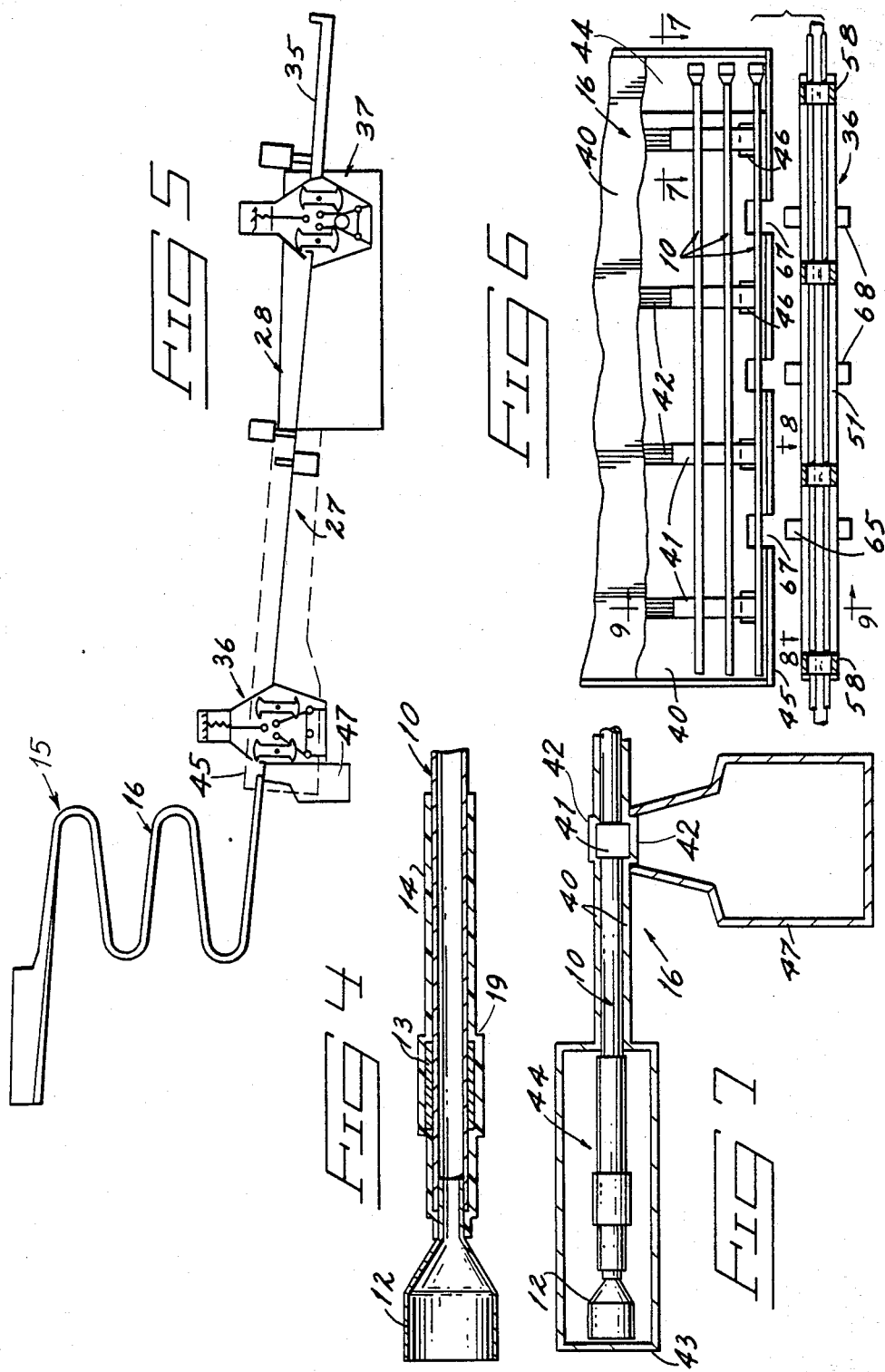

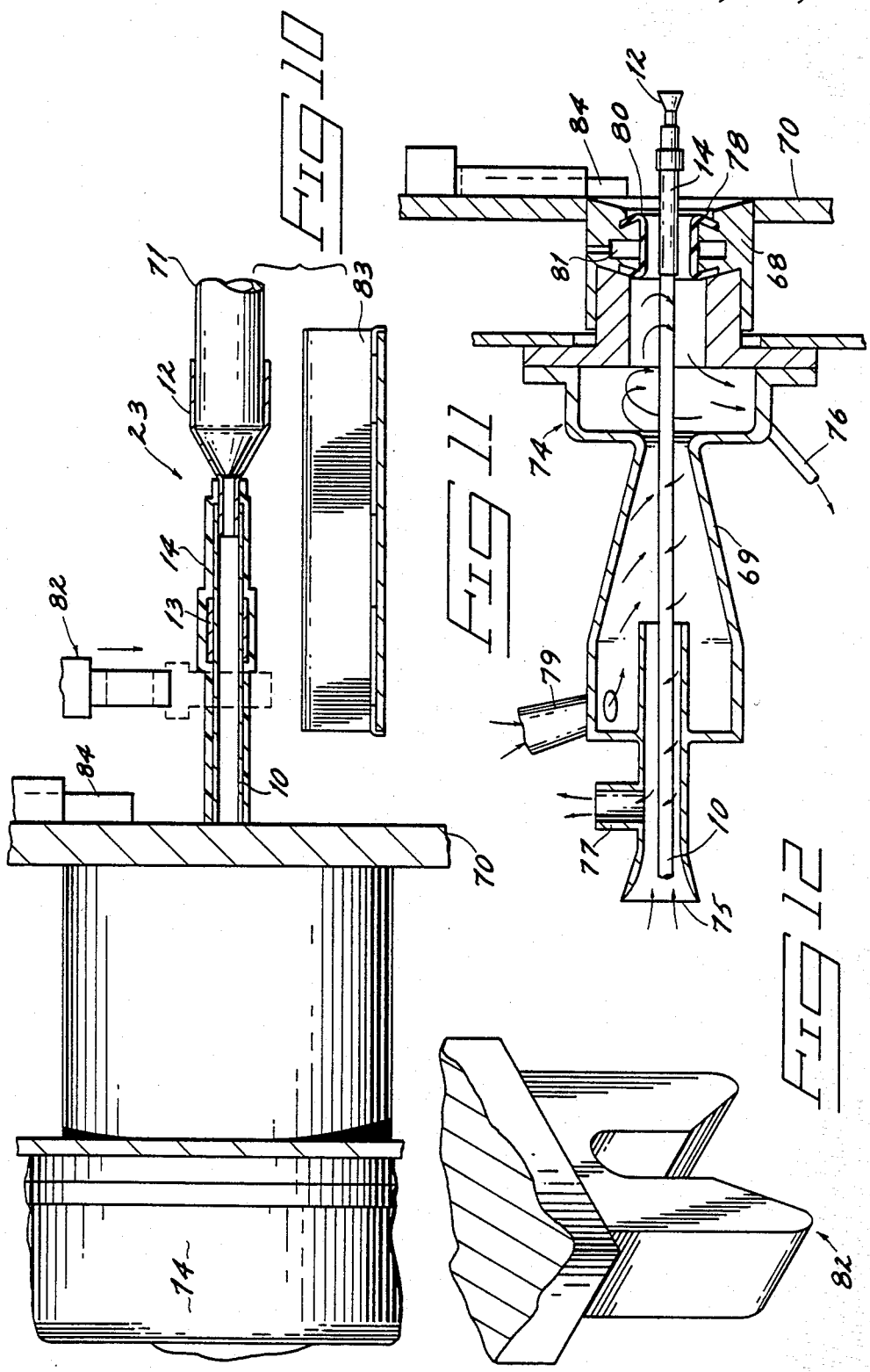

VALVE FOR FUEL PIN LOADING SYSTEM

The U.S. government has rights in this invention pursuant to Contract DE-AC14-76FF02170 between the U.S Department of Energy and Westinghouse Electric Corporation.

BACKGROUND OF THE INVENTION

The present invention relates generally to automated loading of fuel assemblies for nuclear reactors. It comprises a valve for preventing contamination spread along a length of cladding during and after loading of the cladding with nuclear fuel.

This disclosure relates to the assembly of nuclear fuel assemblies, particularly for use in fast breeder reactors. The present state of the art involves fabrication of fuel assemblies by manual manipulation or by mechanical processes incapable of limiting spread of radioactive contamination to adjoining components and equipment. In such configurations, the fabrication steps are time consuming and create significant radiation contamination control problems.

To achieve flexibility of process steps, radiation contamination control, and efficient fabrication in an apparatus having production capability, the present invention has been directed toward development of a self-contained automated loading system.

A major concern when loading fuel assemblies, particularly by automated equipment, is to assure that reactive particles are not carried from the loading area when the fuel assembly is removed. This requires use of an effective seal about each cylindrical length of cladding during the time it is being filled. According to this disclosure, the seal doubles as an effective gaseous stripping device to clean contaminants from the cladding exterior as the fuel assembly is subsequently retracted.

U.S. Pat. No. 4,167,959 discloses a glove box loading apparatus for fuel rods in which contamination spread is stated to be controlled by differential pressures between adjacent sealed chambers.

An elongated flexible seal that is inflatable to engage transverse portions of moving fuel rods is shown in U.S. Pat. No. 4,070,240.

U.S. Pat. No. 3,907,123 discloses a flexible iris seal at the opening of a fuel loading apparatus. Inflatable dual seals for this purpose are shown in FIG. 2 of U.S. Pat. No. 4,158,601.

U.S. Pat. No. 3,711,993 relates to an airlock or cylindrical seal for engagement about the periphery of fuel cladding.

SUMMARY OF THE INVENTION

It is an object of this invention to provide a novel seal or valve at the entrance of a fuel pin loading station by which the surfaces of each length of cladding is effectively sealed and stripped of contaminant particles as it is retracted after loading.

Another object is to provide a positive physical seal about the cladding in conjunction with an active gaseous seal to insure against contamination during the periods when the physical seal is open to receive or release a length of cladding.

Another object is to provide a valve at the entrance of a fuel pin loading station within which a cyclone gas pattern surrounds the cladding to strip its surfaces of loose contaminant particles as the pin is retracted from the loading station.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention as embodied and broadly described herein, the apparatus of this invention may comprise a cyclone valve arranged coaxially outward of the entrance seal that surrounds and closes upon the length of cladding being filled. Air or gas is drawn inwardly along the cladding surfaces and mixes with a scrubbing cyclone flow that surrounds the cladding. Controlled exhaust from the cyclone flow confines any particles that are removed from the cladding. The inward flow of gas along the cladding prevents outward movement of particles from within the fuel loading station.

BRIEF DESCRIPTION OF THE DRAWINGS

The accompanying drawings, which are incorporated into and form a part of the specification, illustrate several embodiments of the present invention and, together with the description, serve to explain the principles of the invention. In the drawings:

FIG. 1 is a simplified flow diagram of an automated fuel loading system;

FIG. 2 is a fragmentary perspective view of the outer ends of a preassembled fuel pin prepared for the system;

FIG. 3 is a simplified plan view of the apparatus;

FIG. 4 is a cross-sectional axial view along the open end of a prepared fuel pin;

FIG. 5 is a schematic elevational view of the apparatus;

FIG. 6 is a fragmentary plan view of the interface between the conveyor and transport as seen along line 6—6 in FIG. 9;

FIG. 7 is an enlarged fragmentary sectional view taken along line 7—7 in FIG. 6;

FIG. 10 is a side elevational view of the fuel pin loading station;

FIG. 11 is an axial sectional view through the cyclone valve assembly shown in FIG. 10; and FIG. 12 is an enlarged perspective view of a funnel removal tool.

DETAILED DESCRIPTION OF THE INVENTION

Figure 8:
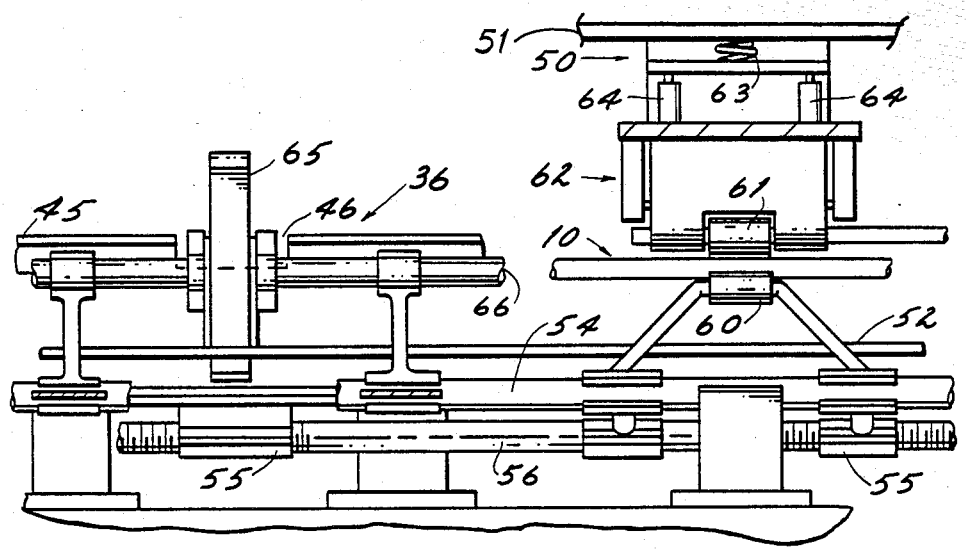
FIG. 8 is a fragmentary elevational view of the transport as seen along line 8—8 in FIG. 6.

This invention relates to an automated fuel pin loading system for nuclear reactors. It is directed specifically to an improved valve for preventing spread of contamination along or on the surfaces of cladding at the entrance to a fuel loading station.

FIG. 1 shows the general flow path for fuel pin fabrication. The boxes bounded by dashed lines represent components of the potentially contaminated automated fuel pin loading system which is the subject of this disclosure.

A fuel pin subassembly as fabricated is shown in FIG. 2. The subassembly consists of a welded end cap 11, shown as the bottom end of the fuel pin, internal non-contaminated fuel pin hardware (not shown) adjacent the welded end cap 11, and a fuel loading funnel 12 mounted to the remaining open end of the fuel cladding 10.

As shown in FIG. 4, the funnel 12 has an enlarged outer open end that leads to a reduced diameter neck. A conical transition section connects the open end of funnel 23 to its neck. The smaller neck is at least partially inserted into the open axial end of the cladding as a coaxial extension of it. The fit between the funnel neck and the cladding interior should be reasonably close, and the thickness of the funnel neck should be minimal.

The funnel 12 is held within the length of cladding 10 by a continuous length of plastic shrink tubing 14. After placement overlapping a portion of both the funnel and cladding, the tubing 14 is shrunk diametrically by proper application of heat. It tightly encircles and grips both the cladding 10 and funnel 12. It maintains them as a unit during reception of fuel into the cladding through the funnel 12.

The funnel 12 is designed to be discarded after the length of cladding 10 has been charged with fuel pellets. Removal of the funnel is accomplished by pulling tubing 14 as cladding 10 is retracted axially. Removal is facilitated by providing a slidable collar or ring 13 that surrounds cladding 10 beneath the shrink tubing 14. The coaxial ring 13 presents a rear annular shoulder 19 which can be engaged to pull ring 13, tubing 14 and funnel 12 as a unit. If desired, the shoulder 19 could be presented as part of that portion of funnel 12 enveloped under the shrink tubing 14.

The tubing 14 preferably extends along the outer surface of cladding 10 as an outer protective element. It provides a cylindrical surface for engagement by resilient or inflatable seals. Particles embedded in the tubing 14 as a result of such sealing will be discarded with the tubing when it is removed. This minimizes contamination of the cladding itself.

It is to be understood that the funnel 12 could have many different interior or exterior configurations, so as to match the physical shape and requirements of particular pellet loading devices. These modifications are not believed to be pertinent to the present disclosure, since they will not change the manner by which the funnel is related to the length of cladding.

Referring to the flow path shown in FIG. 1 and the associated schematic plan view shown in FIG. 3, the general steps of the process carried out by this system can be outlined. The uppermost box 1 in FIG. 1 indicates the step of fabricating the fuel pin subassembly, which is accomplished outside the scope of the present system. Box 2 of the flow diagram represents the loading or feeding of the fabricating fuel pin subassemblies into the system. This is accomplished by a cladding loader 15 comprising a suitable gravitational hopper for individually directing the lengths of fuel cladding 10 into a gravity feed conveyor shown generally at 16. The gravity feed conveyor directs parallel lengths of fuel cladding 10 from one station to the next in this system.

The individual lengths of fuel cladding 10 are next loaded with fuel pellets as required by the reactor for which they are designed. This general step is represented by box 3 in the flow diagram. It is accomplished at a pellet loading station 23. The pellet loading station 23 is environmentally isolated from the remainder of the equipment in order to prevent radioactive contamination of the conveying and handling elements which necessarily contact the fuel cladding 10. To assure against contamination, the filled lengths of fuel cladding 10 are cleaned and temporarily plugged, steps represented by box 4 in the flow diagram. These steps are carried out in a cleaning and capping unit 25 at the entrance/exit of the pellet loading station 23.

Final assembly of the fuel pin is represented by box 5, and is accomplished in an inerting enclosure 28 and welding station 30. The gas within the fuel cladding 10 is displaced by a desired inert atmosphere, the interior components of the fuel pin assembly are loaded adjacent to its open end, and the open end is sealed by a welded cap.

The boxes 6 and 7 in the flow diagram represent inspection and release steps carried out in addition to the steps of this system prior to actual usage of the fuel pins.

To complete the discussion of FIG. 3, it further represents a pellet loading tray 24 included within the pellet loading station 23. The loading tray 24 arranges individual pellets in elongated rows for insertion within individual lengths of fuel cladding. Also provided within the pellet loading station 23 is a funnel handling unit 26 which receives the funnels 12 after removal from each length of fuel cladding 10. It maintains the funnels in a guarded environment for subsequent disposal.

Interspersed along the length of the gravity feed conveyor 16 are two cladding transports 36 and 37 aligned alongside the pellet loading station 23 and the welding station 30, respectively. Transports 36 and 37 are described in detail below. They basically position individual lengths of fuel cladding 10 for axial movement relative to the gravity feed conveyor 16. They also have the capability of imparting rotational movement to the fuel cladding 10 for rotation about their individual longitudinal axes. Axial and rotational movement of the cladding is coordinated with the functions of the equipment operating at the open end of the length of fuel cladding 10 during the steps carried out within this system.

An accumulator 27 is arranged between transport 36 and the inerting enclosure 28. As will be described in greater detail below, the accumulator gathers a relatively large number of loaded lengths of fuel cladding, which are then fed as a batch into the inerting enclosure 28.

To complete the system, fuel pin storage facilities 35 are provided downstream from transport 37. They are arranged to receive the completed fuel pins from the system, holding them for subsequent inspection and eventual release.

The welding station 30, as shown schematically in FIG. 3, includes a welder 31, an end hardware loader 34, and an end cap feeder 32. Various components which must be directed into or onto the open end of each length of fuel cladding prior to welding of an end cap are moved into place by a barrel loader, generally shown at 33.

The details of the gravity feed conveyor 16 are shown in FIGS. 5 through 7 and 9. The gravity feed conveyor, which leads between the cladding loader 15 and the first cladding transport 36, is longitudinally compressed by transverse folds arranged one above the other in a zigzag path. The path is constantly inclined in a downward direction between loader 15 and transport 36. Conveyor 16 might be defined by a plurality of elongated rods arranged along the intended direction of travel of the cladding 10, by solid plates, or by a combination of rods and plates. As shown in the drawings, the lower reach of the conveyor 16 is illustrated as including top and bottom guide plates 40 which are mirror images of one another, the two plates being designed to alternately support the rolling lengths of fuel cladding 10 as the various folds along the conveyor are traversed.

The illustrated conveyor guide plates 40 are bounded along their sides by end guide plates 43 which prevent unwanted axial movement of the fuel cladding as it rolls along the supporting guide plates 40. To accommodate the radially enlarged end of each cladding subassembly presented by funnel 12, block spacers 41 are inserted between adjacent lengths of the cylindrical fuel cladding 10. The dimensions of the spacers 41 are such as to assure clearance between adjacent funnels 12 on the lengths of cladding. The spacers are identical in size and shape to assure parallel positioning and consistent, free rolling of the engaged lengths of fuel cladding 10. The block spacers 41 are preferably made of cotton or other suitable disposable material that will not damage the outer surfaces of the cladding nor substantially interfere with rolling motion of the cladding along the gravity feed conveyor 16.

The block spacers 41 slide along recessed spacer troughs 42 which extend along the lengths of the plates 40. At the end of plates 40 adjacent to the enlarged funnels 12 is provided a larger funnel trough 44, which provides clearance between the inner surfaces of guide plates 40 and the funnels 12. Thus, the lengths of cladding 10 roll along their uniform cylindrical surfaces, and are not misguided by rolling contact of the funnels 12.

The lower guide plate 40 leads to an upright transverse stop 45 which spans the width of the cladding 10. Each of the spacer troughs 42 includes an aperture 46 which serves as a spacer exit through which the block spacers 41 can freely drop into a receiving spacer collector shown at 47. The block spacers 41 drop into the collectors 47 as each length of cladding 10 is lifted from contact against the stop 45. The dropping of block spacers 41 is illustrated in dashed lines in FIG. 9.

The drawings illustrate details of one transport 36, which is designed to accommodate a single length of cladding 10. It is to be understood that multiple lengths of cladding could alternately be handled in a batch processing system by either duplicating the illustrated transport 36 or by designing transport 36 to support multiple lengths of fuel cladding simultaneously.

Figure 9:
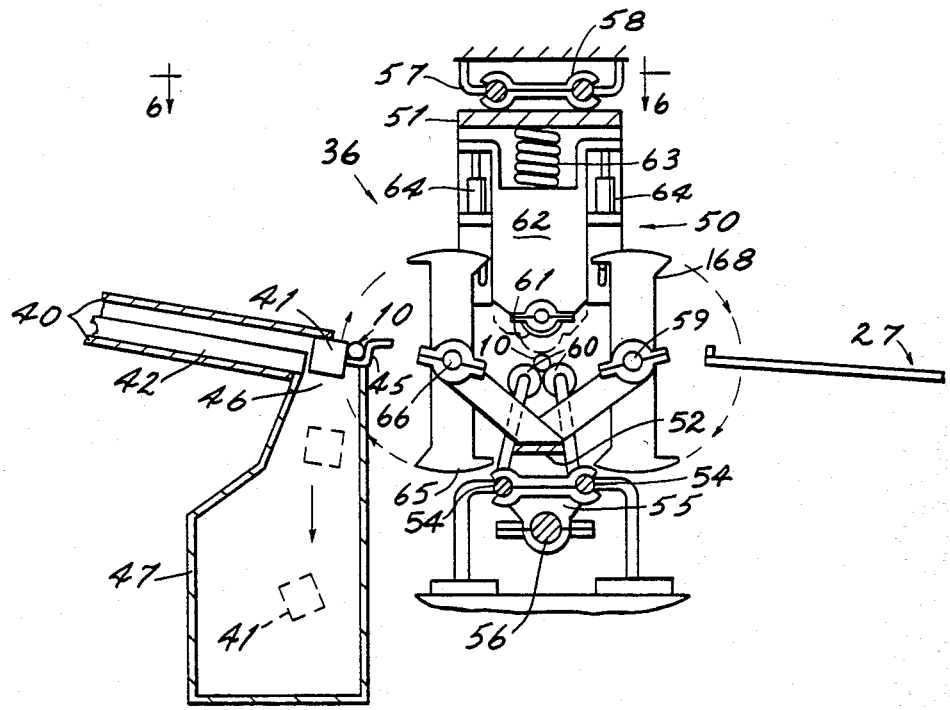
FIG. 9 is an enlarged cross-sectional view taken along line 9—9 in FIG. 6.

The details of the transports 36 and 37, which are identical in structure, are illustrated in FIGS. 6, 8, and 9. Each transport includes a reciprocable trolley adapted to selectively move in a transverse direction across the gravity feed conveyor 16. The trolley comprises an upper elongated plate 51 and a lower elongated plate 52. Both are horizontal and one is elevationally spaced above the other.

The trolley is supported by a pair of horizontal lower guide tracks 54 mounted to a supporting stationary framework and by a similar pair of stationary tracks 57 immediately above place 51. Slide bearings 55 provided at intervals along the length of trolley 50 engage the lower tracks 54. They are driven by threaded engagement with a transverse lead screw 56. The lead screw 56 provides powered means operably connected to trolley 50 selectively operable for shifting the transport relative to the gravity feed conveyor in a transverse direction.

Similar slide bearings 58 engage the upper tracks 57 to guide the upper portions of trolley 50 for reciprocable sliding movement in the transverse direction.

Cladding support is provided on trolley 50 by paired sets of lower cladding support rollers 60 properly spaced so as to cradle each length of cladding 10 while it is positioned along a preselected operational axis defined by the longitudinal center axis of the cladding. Moveable upper support rollers 61 selectively engage the cladding 10 in opposition to the lower rollers 60 to thereby fix the cladding position on trolley 50. The upper rollers 61 are mounted on roller frames 62 which include motors (not shown) that power the rollers 61 to impart rotational movement to the lengths of fuel cladding. The cladding can therefore be selectively rotated about its central axis when desired by operation of the powered upper support rollers 61.

The roller frames 62 for the upper support roller 61 are yieldably biased to an operational or lowered position by compression spring 63. Springs 63 are interposed between each roller frame 62 and the upper elongated plate 51. The roller frames 62 are guided on the frame of trolley 50 for limited vertical movement between a released or elevated position shown in full lines in FIG. 9 and a lowered or operational position shown in dashed lines. The raising of roller frames 62 is accomplished by small powered cylinders 64 which lift the frames 62 in opposition to the forces of springs 63.

The lengths of cladding 10 are placed on the lower support roller 60 of trolley 50 by movable incline means shown as rotatable arms 65 intermittently spaced across the width of trolley 50. Arms 65 are powered for intermittent rotational movement about a transverse center axis along a common powered shaft 66. The outer ends of arms 65 include protrusions which selectively cradle each length of cladding 10 as it rests against the stop 45 across the gravity feed conveyor 16. The lower guide plate 40 of the gravity feed conveyor is provided with open recesses 67 which provide clearance for rotational pivotal movement of the arms 65 as they come upward beneath each stationary length of cladding.

After engagement of the cladding, continued rotational movement of the arms 65 permits each length of cladding to roll along the inclined upper surfaces of the arms and into engagement with the opposite protrusions at the opposite or lower arm end. Further rotational movement deposits the cladding between the lower cladding support rollers 60.

The lengths of cladding are removed from trolley 50 by a similar set of rotational arms 168 fixed to a separate powered shaft 59. The arms 168 eject each length of fuel cladding 10 and permit it to roll onto the receiving longitudinal rods or support plate surfaces of accumulator 27 (FIG. 9). The accumulator rods or plates are inclined so as to continue gravitational movement of the cladding along the length of the system equipment.

Loading of fuel pellets is accomplished at the pellet loading station 23. Operational details of this station are illustrated in FIGS. 10, 11 and 12. The cladding 10 is inserted through a contamination boundary wall 70 and held stationary by the supporting transport 36. A complementary fuel loading tube 71 is fitted within the interior of funnel 12, minimizing free particle contamination spread. Fuel pellets (not shown) are then guided through the fuel loading tube 71 and funnel 12 to the interior of the cladding 10. The pellet load for each length of cladding 10 can be prearranged along a pellet loading tray 24 (FIG. 3). Any suitable mechanism can be used to push the row of pellets through tube 71 and into the cladding.

Contamination by release of particles is prevented by the present valve, which is a dual seal shown in greater detail in FIG. 11. This comprises a cyclone valve 74 which surrounds an opening in the wall 70 through which the cladding 10 is projected for loading purposes. The valve 74 has a pressurized gas inlet 79 leading into a tapered chamber for directing a spiraling stream of gas tangentially about a fuel pin subassembly in a direction leading to the wall 70. The tapered chamber is shown as an enclosed hood 69 of increasing diameter extending outward from wall 70 and an outlet for the resulting underflow at 76. An axial inlet 75 leading into the cyclone valve 74 is shown as a cylindrical open tube that surrounds the cladding 10. Air or gas outside wall 70 is drawn through inlet 75. It exhausts at 77, which draws air from within the cyclone valve 74 as well. The scrubbing action of the cyclone valve is illustrated by the arrows shown in FIG. 11.

Combined with the cyclone valve 74 is an inflatable seal 78. Seal 78 is located within a valve base 68 which is sealed within a complementary aperture formed through wall 70. This includes an elastic cylindrical diaphragm 80 which can be inflated and extended radially inward by pressurized air directed to a surrounding annular groove 81. Seal 78 can therefore be moved between an open condition capable of permitting passage of the open end of a fuel pin subassembly (shown in FIG. 11) and a closed condition in which the periphery of a fuel pin is engaged about its circumference. During the loading sequence, the axial position of cladding 10 is such that the adjacent end of the shrink tubing 14 is positioned within the inflatable seal 78 and is overlapped by diaphragm 80. The shrink tubing 14 thereby prevents possible embedding of particles in the outer surface of the cladding 10.

After loading of the cladding 10, it is retracted by transport 36, which draws the open end of the cladding through the boundary wall 70. As this is being accomplished, the shrink tubing 14, funnel removal ring 13 and funnel 12 are stripped from the open end of the cladding 10 by a removal clamp 82 that is movably mounted at the inner surface of wall 70 (FIGS. 10, 12). Clamp 82, which is solenoid operated, moves between a position clear of the fuel cladding 10 and a stripping position in which it straddles the shrink tubing 14 inwardly of the funnel removal ring 13. The adjacent shoulder 19 on the funnel removal ring 13 engages the legs of the removal clamp 82 as the cladding is retracted from the pellet loading station 23, causing the shrink tubing 14, funnel removal ring 13 and funnel 12 to drop onto a receiving funnel removal tray 83. These items are then conveyed to the funnel handling unit 26 for disposal purposes.

After the open end of the cladding 10 has passed into the cyclone valve 74 during its retraction, the opening in the wall 70 can be positively sealed by a solenoid controlled gate 84. Gate 84 prevents any further release of contaminating particles from the interior of pellet loading station 23.

The cyclone valve 74 strips debris from the cladding 10 as the cladding is removed from the pellet loading station 23. This is accomplished by the high velocity turbulent gas flow which surrounds the outer surfaces of the cladding 10 as indicated in FIG. 11. The cyclone valve 74 also prevents particle ejection from the interior of the pellet loading station 23.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments discussed in detail were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A valve for facilitating axial entry and exit of the open end of a fuel pin subassembly through a supporting apertured wall of an enclosure, comprising:

a valve base adapted to be sealed within an aperture in the wall, said valve base including an inflatable seal movable between an open condition capable of permitting passage of the open end of a fuel pin subassembly and a closed condition in which the periphery of a fuel pin is engaged about its circumference;

chamber means extending outward from the valve base in approximately coaxial open communication with the inflatable seal; the chamber means including an enclosed hood extending outward from the valve base;

gas inlet means spaced from said valve base for directing a stream of pressurized gas tangentially into the enclosed hood and toward the valve base to form a spiraling flow of gas about a fuel pin positioned therein; and gas outlet means adjacent the valve base for exhausting gas flowing through the chamber means.

2. The valve of claim 1 wherein said enclosed hood is conical and of increasing diameter extending outward from the base.

3. The valve of claim 2, further comprising:

a cylindrical open tube arranged coaxially with said cylindrical seal and protruding outward through the conical hood, said tube having an inner end open to the interior of the conical hood;

the inner diameter of said open tube providing clearance for coaxial passage of a fuel pin subassembly therethrough.

4. The valve of claim 1 further comprising:

a cylindrical open tube arranged coaxially with said cylindrical seal and protruding outward through the conical hood, said tube having an inner end open to the interior of the conical hood;

the inner diameter of said open tube providing clearance for coaxial passage of a fuel pin subassembly therethrough.

* * * * *